June 20, 1967  R. J. NOVOTNY  3,325,998

VARIABLE THRUST ROCKET MOTOR

Filed April 14, 1965  2 Sheets-Sheet 1

INVENTOR:
RAYMOND J. NOVOTNY
BY
Curtis, Morris & Safford
ATTORNEYS.

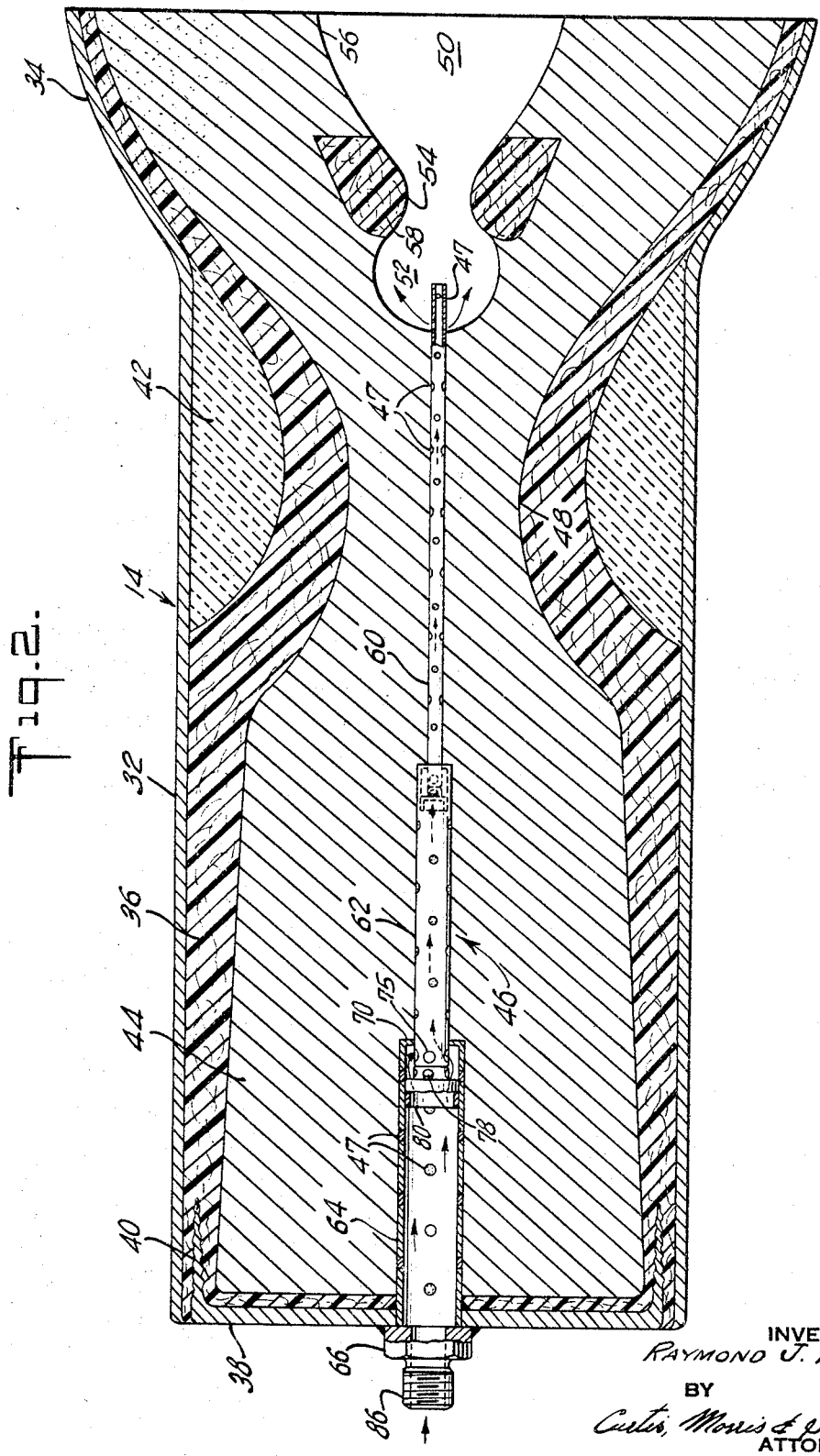

United States Patent Office 3,325,998
Patented June 20, 1967

3,325,998
VARIABLE THRUST ROCKET MOTOR
Raymond J. Novotny, Dover, N.J., assignor to Thiokol Chemical Corporation, Bristol, Pa., a corporation of Delaware
Filed Apr. 14, 1965, Ser. No. 448,019
7 Claims. (Cl. 60—251)

This invention relates to rocket motors and more particularly to a novel rocket motor that is especially well adapted to be used in controlling the velocity of a space vehicle upon its re-entry into the earth's atmosphere.

It is well known that a vehicle which has been propelled into outer space along a suborbital trajectory encounters, upon re-entering the earth's atmosphere, rapidly increasing air resistances that tends to decelerate the vehicle. Under certain circumstances such deceleration of the re-entering vehicle is undesirable and it is desired to maintain the velocity of the vehicle essentially constant. It is evident that under these circumstances auxiliary power is required to overcome the increasing atmospheric drag to which the vehicle is subjected as it approaches the earth's surface. Moreover, if a constant velocity is to be maintained the auxiliary power source must be capable of producing a rapidly increasing thrust.

It is an object of the present invention to provide an improved lightweight rocket motor especially adapted to be used for powering a vehicle re-entering the earth's atmosphere to overcome, at least partially, the decelerating effect of atmospheric drag on the vehicle. It is another object of the invention to provide an exceptionally simple rocket motor capable of generating a rapidly increasing but smoothly progressive thrust pattern. It is still another object of the invention to provide a rocket motor capable of producing such a progressive thrust pattern with a minimum of moving parts. Other objects of the invention will be in part obvious and in part pointed out hereafter.

The many objects and advantages of the present invention can best be understood and appreciated by reference to the accompanying drawings which illustrate a rocket motor incorporating a preferred embodiment of the present invention and wherein:

FIGURE 2 is an enlarged axial section through the combustion chamber illustrating further details of the construction thereof and showing the liquid propellant injector tube partially in elevation and partially in section.

Figure 1:
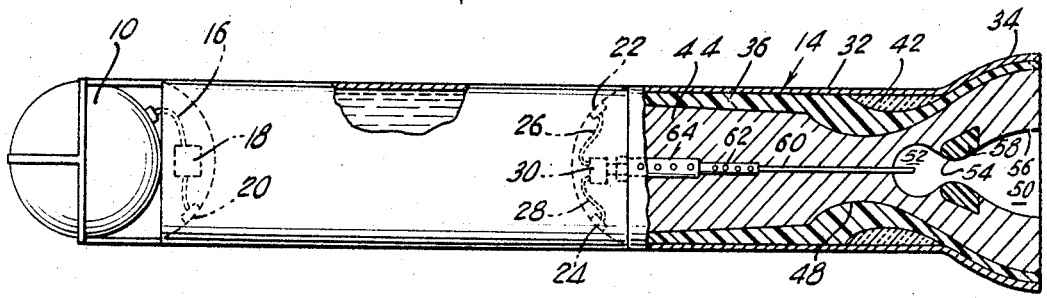
FIGURE 1 is a side view of the rocket broken away at the rear portion thereof to show the internal construction of the combustion chamber.

Referring to the drawings and more particularly to FIGURE 1, the rocket there shown is of the so-called "hybrid" type utilizing a hypergolic combination of liquid and solid propellants. The combination propellant may comprise either a liquid fuel and a solid oxidizer or a liquid oxidizer and a solid fuel. The latter combination is preferred, and the rocket motor shown in the drawings will be described in terms of this preferred propellant combination.

Still referring to FIGURE 1 the rocket motor shown comprises in general three sections, namely a head-end section at the left of FIGURE 1 which contains a pressurizing gas storage tank 10, a central section containing the liquid propellant storage tank 12 and a combustion chamber and nozzle section generally designated 14. The tank 10 contains a suitable pressurizing gas such as helium under relatively high pressure and is connected by a conduit 16 with the left end of tank 12. In the conduit 16 there is a suitable and conventional control valve 18 and a burst diaphragm 20. The arrangement is such that when valve 18 is opened, gas under pressure bursts the diaphragm 20 and pressurizes liquid propellant in tank 12.

At the right hand end of propellant tank 12 there are a pair of rupture discs 22 and 24 which upon pressurization of tank 12 are ruptured, whereupon liquid propellant flows through conduits 26 and 28 and a control valve 30 to the combustion section 14 of the rocket. Since the propellant tank 12, pressurizing tank 10 and related conduits and controls are conventional, they need not be described in detail herein.

Referring now to FIGURE 2 which shows the construction of the combustion chamber and nozzle portion of the rocket motor on an enlarged scale, this section of the rocket motor comprises an outer casing 32 which may be of the wound glass-fiber type and may be integral with a casing enclosing the liquid propellant storage compartment. At its rear end the casing 32 has an outward flare 34 to accommodate a body of nozzle-forming material that will presently be described.

For much of its length the casing 32 is lined with an ablative liner 36 which may be made of any of several types of ablative material known in the art to be useful for such applications. For example, the liner 36 may be made of a glass fiber-reinforced phenolformaldehyde resin with the reinforcing fibers having a random orientation. At the left end of casing 32 and substantially closing the opening thereof, there is a metal disc 38 having a corrugated annular flange 40 embedded in the liner 36. Approximately midway between the ends of casing 32 and between the casing and liner 36 there is an annular ring of insulating material 42. The insulating ring 42 may comprise any suitable lightweight insulating material, one satisfactory type of material being a body of highly porous epoxide resin of the type disclosed in Milewski et al. application Ser. No. 169,319 filed Jan. 29, 1962.

The cavity within the liner 36 is filled with a body of solid fuel 44 in which there is embedded a liquid propellant distributor tube generally designated 46. The fuel body 44 is preferably of the type formed by introducing a curable essentially hydrocarbon polymer in viscous liquid form into the rocket casing and curing it in situ therein. Such curable polymers are well known in the rocket art and have been extensively used in the manufacture of solid propellants. The body of solid fuel 44 is cast around the distributor tube 46 and hence tightly encases it in the solid material of the fuel body.

As shown in FIGURE 2, the inner wall of the liner 36 has a converging-diverging configuration and forms a throat 48 which as described in detail hereafter becomes the throat of a nozzle during the latter stages of the firing of the rocket motor. The solid fuel body 44 and distributor tube 46 extend through the neck 48 and the fuel body fills the opening formed by the divergent portion of liner 36, except for a central cavity 5. The walls of the cavity 50 define what is in effect an inner nozzle comprising an approximately spherical recess 52 into which the end of distributor 46 extends, a nozzle throat 54 and a diverging opening 56 through which hot combustion gases can be discharged from the motor. At the throat 54 the fuel body 44 is recessed to receive a heat resistant insert 58 which is desirably made of an ablative material. The nozzle throat insert 58 may be made of the same material as liner 36, although in the case of insert 58 the fibers are desirably oriented in a direction approximately transverse to the direction of flow of hot combustion gases through the nozzle throat.

The distributor tube 46 comprises three sections, namely a tail section 60, center section 62 and inlet section 64. As indicated in FIGURE 2, the sections are of progressively increasing diameter and each section is perforated to form discharge openings 47 through which liquid propellant can flow. The discharge holes 47 of the several sections of the distributor tube are initially blocked with plugs of a low melting point alloy such as soft solder, except for those holes that are in the wall of the end of tail section 60 that extends into recess 52. The left end of inlet section 64 is suitably secured in the partition 38 as by welding, and on the left side of partition 38 there is secured a fitting 66 having a threaded end 68 to which a liquid propellant supply conduit can be connected.

When the liquid propellant tank is pressurized as described above, liquid oxidizer flows through the distributor tube 46 and through the holes 47 in the discharge end of tail section 60 into the recess 52. Since the liquid oxidizer and surrounding solid fuel are hypergolic, spontaneous ignition occurs and combustion gases thus formed flow through the nozzle throat 54 and the divergent opening 56 in the fuel body. Thus recess 52, throat 54 and divergent opening 56 form an inner combustion chamber and nozzle during the early stages of combustion.

As combustion proceeds, the fuel encasing the insert 58 is consumed and the insert is ejected from the rear end of the motor. Also the burning surface of the fuel body moves forward to expose additional holes 47 in the tail section 60. When these additional holes are exposed to the temperature of the burning gas, the soft metal plugs are melted and additional openings are provided for discharge of liquid oxidizer. Thus the orifice area for discharge of liquid oxidizer from the distributor tube progressively increases as burning proceeds.

The tail section 60 of tube 46 is connected to center section 62 through a joint which will be described in detail hereafter and which operates in such manner that when the burning surface of the fuel body reaches this joint, the tail section 60 becomes detached and is ejected from the motor. In like manner, when the burning surface of the fuel body reaches the joint between center section 62 and inlet section 64, the center section becomes detached and is ejected from the motor. As indicated in FIGURE 2, the holes in center section 62 are desirably made of somewhat larger diameter than those in the tail section 60, and similarly the holes in inlet section 64 are of somewhat greater diameter than those in center section 62. As a result of this progressive increase in discharge opening size, as well as the progressive increase in diameter of the tube sections, there is a substantial increase in the discharge rate of liquid oxidizer as combustion proceeds, and hence a relatively rapid increase in the thrust generated by the motor.

Figure 3:
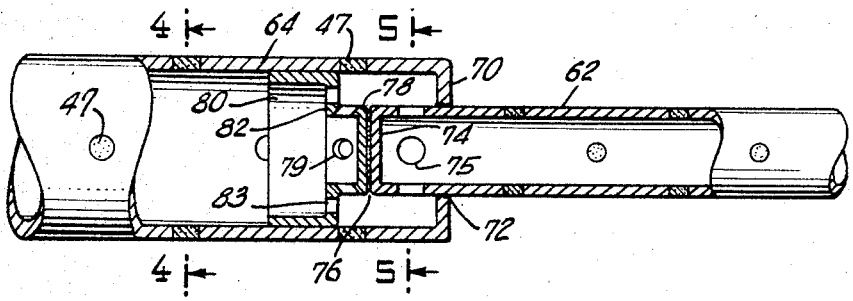
FIGURE 3 is a detailed view, on a still further enlarged scale, of one of the joints of the liquid propellant injector tube.
Figure 4:
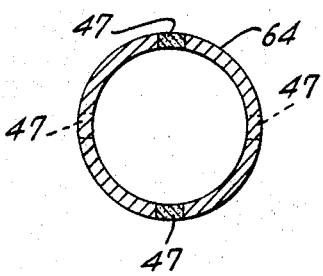
FIGURE 4 is a transverse section through the injector tube taken on a line 4—4 of FIGURE 3 and showing the arrangement of flow orifices therein.
Figure 5:
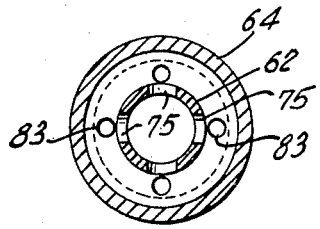
FIGURE 5 is a transverse section through the injector tube taken on a line 5—5 of FIGURE 3 and showing further details of the construction of one of the injector tube joints.

The construction of the joints between the several sections of the distributor pipe 46 is best shown in FIGURES 3 to 5 of the drawings. Since the joints between the several sections may be of similar construction, only the joint between center section 62 and inlet section 64 has been shown in detail. Referring to FIGURE 3, the discharge end of inlet section 64 is closed by a partition 70 having an opening through which the inlet end of center section 62 extends. The two sections are initially secured together by a seal 72 of low melting point metal which is capable of melting when the burning surface of the surrounding fuel body reaches this point. The inlet end of tube section 62 is closed by a wall 74 connected by a meltable metal seal 76 to a cup-shaped member 78 mounted on a slide 80 that is slidable within the inlet section 64 of the distributor tube. More particularly, the cup 78 is mounted on a transverse wall 82 of the slide 80. As shown in FIGURES 3 to 5, the side wall of center section 62 that extends into inlet section 64 is provided with liquid flow openings 75, the side wall of the cup 78 has holes 79 therein and the transverse wall of slide 80 has holes 83 therein. During the initial stage of combustion, liquid oxidizer flows through holes 79 and 83 within the joint and thence through holes 75 into section 62 of the distributor tube.

The mode of operation of the joint just described is as follows: When the burning surface of the fuel body reaches the partition 70, seal 72 is melted and the slide 80 and connected inlet end of center section 62 are forced to the right by the pressure of the stream of liquid oxidizer until transverse wall 82 comes into contact with partition 70. Thereupon the meltable seal 76, which has passed through the hole in partition 70, becomes exposed to the hot gases and the joint 76 is melted. Center section 62 is thus released and is ejected from the motor by the stream of hot gases. As indicated above, the joint between sections 60 and 62 of the distributor tube may be of the same construction as that just described.

It will be evident to those skilled in the art that a wide variety of known fuels and oxidizers can be used in the rocket motor of the present invention. For example, the solid fuel body 44 may be formed from any of various high molecular weight hydrocarbon polymers having reactive terminals through which they can be cured. Also the known copolymers of butadiene and acrylic acid that have been used in solid propellant compositions can be employed in the present motor. Conventional liquid oxidizers such as hydrogen peroxide and nitrogen tetroxide are suitable for use in this motor. If a "reverse hybrid" system is desired, the tank 12 may be charged with a liquid fuel such as hydrazine and the propellant body encasing distributor tube 46 may be largely composed of a solid inorganic oxidizer.

From the foregoing description it should be apparent that the present invention provides a motor of exceptionally simple construction which is capable of yielding a very sharp increase in thrust during the firing period. The rate of increase of thrust can be readily varied by varying the number and size of the holes in the wall of distributor tube 46. By proper selection of the number and size of the openings in distributor tube, the total orifice area available for discharge of liquid propellant into the combustion chamber can be made large enough to yield a very high ratio of final flow to initial flow of liquid oxidizer, i.e. a ratio of 100:1 or greater. Since the distributor is cooled by flow of liquid oxidizer therethrough, it can be made of a conventional structural metal.

By casting the distributor tube within the body of solid fuel, the tube is firmly embedded within the fuel body and the holes in the tube, except for those holes in the tip of the tube within recess 52, are effectively blocked until they are uncovered by combustion of the surrounding fuel. With the construction shown, there is, in effect an automatic control of the rate of change of combustion without the use of any control mechanism having moving parts.

It is of course to be understood that the foregoing description is intended to be illustrative only and that numerous changes can be made in the preferred embodiment described without departing from the spirit of the invention as defined in the appended claims.

I claim:

1. A rocket motor comprising a casing having a discharge nozzle at the rear end thereof, a body of solid propellant located in the rear portion of said casing adjacent to said nozzle, a liquid propellant injector tube extending axially of said casing and embedded in said solid propellant, said tube having orifices formed in the wall thereof, a container for liquid propellant located in said casing, means for connecting said container to the forward end of said injector tube and means for pressurizing said container to cause liquid propellant to flow into said injector tube, whereby upon ignition of said motor progressive burning of said solid propellant exposes progressively increasing orifice areas of said tube to increase the flow of liquid propellant therethrough.

2. A rocket motor according to claim 1 and wherein said injector tube comprises a plurality of sections of different diameters, the diameters of said sections increasing progressively from the rear end to the forward end of said tube.

3. A rocket motor according to claim 1 and wherein the orifices of said injector tube are filled with a fusible solid adapted to melt when said orifices are exposed by burning of the surrounding solid propellant.

4. A rocket motor comprising an elongated casing having at the rear end thereof a discharge nozzle comprising a throat portion and a rearwardly divergent portion, a body of solid propellant located in the rear part of said casing and within said nozzle, the part of said solid propellant within the divergent portion of said nozzle having a central axial recess therein, a liquid propellant injector tube extending axially of said casing and embedded in said solid propellant, said tube extending into said recess and having orifices formed in the wall thereof, a container for liquid propellant located in said casing forward of said solid propellant body, means for connecting said container to the forward end of said injector tube and means for pressurizing said container to cause liquid propellant to flow into said injector tube, whereby upon ignition of said motor progressive burning of said solid propellant exposes progressively increasing orifice areas of said tube to increase the flow of liquid propellant therethrough.

5. A rocket motor according to claim 4 and wherein the wall of said recess converges to form an inner throat between the rear end of said injector tube and the discharge end of said nozzle.

6. A rocket motor according to claim 5 and wherein said inner throat is formed by an ablative insert supported in said solid propellant body.

7. A rocket motor comprising an elongated casing having at the rear end thereof a discharge nozzle comprising a throat portion and a rearwardly divergent portion, a body of solid propellant located in the rear part of said casing and within said nozzle, the part of said solid propellant within the divergent portion of said nozzle having a central axial recess therein, a liquid propellant injector tube extending axially of said casing and embedded in said solid propellant, said tube extending into said recess and having orifices formed in the wall thereof, said orifices being filled with a fusible solid adapted to melt when said orifices are exposed by burning of the surrounding solid propellant, the wall of said axial recess converging to form an inner throat between the rear end of said tube and the discharge end of said nozzle, a container for liquid propellant located in said casing forward of said solid propellant body, means for connecting said container to the forward end of said injector tube and means for pressurizing said container to cause liquid propellant to flow into said injector tube, whereby upon ignition of said motor progressive burning of said solid propellant exposes progressively increasing orifice areas of said tube to increase the flow of liquid propellant therethrough.

No references cited.

CARLTON R. CROYLE, *Primary Examiner.*